C. O. TORGERSON.
VEHICLE STAKE HOLDER.
APPLICATION FILED SEPT. 22, 1915.

1,170,366.

Patented Feb. 1, 1916.

Inventor
Carl O. Torgerson.

By
[signature], Attorneys

UNITED STATES PATENT OFFICE.

CARL O. TORGERSON, OF HOUSTON, MINNESOTA.

VEHICLE-STAKE HOLDER.

1,170,366.  Specification of Letters Patent.  Patented Feb. 1, 1916.

Application filed September 22, 1915. Serial No. 51,913.

*To all whom it may concern:*

Be it known that I, CARL O. TORGERSON, a citizen of the United States, residing at Houston, in the county of Houston and State of Minnesota, have invented certain new and useful Improvements in Vehicle-Stake Holders, of which the following is a specification.

This invention relates to improvements in devices for binding the loads on wagons, bob-sleighs, and like vehicles, and preventing the outward pressure of the load from breaking the stakes which are employed to hold the load in position, and has for one of its objects to simplify and improve the construction and increase the efficiency and utility of devices of this character.

Another object of the invention is to provide a simply constructed device which may be applied without material structural change to vehicles of various sizes and to vehicles employed for holding different forms of commodities.

With these and other objects in view, the invention consists in certain novel features which will be hereinafter shown and described and then specifically pointed out in the claims.

Figure 1:
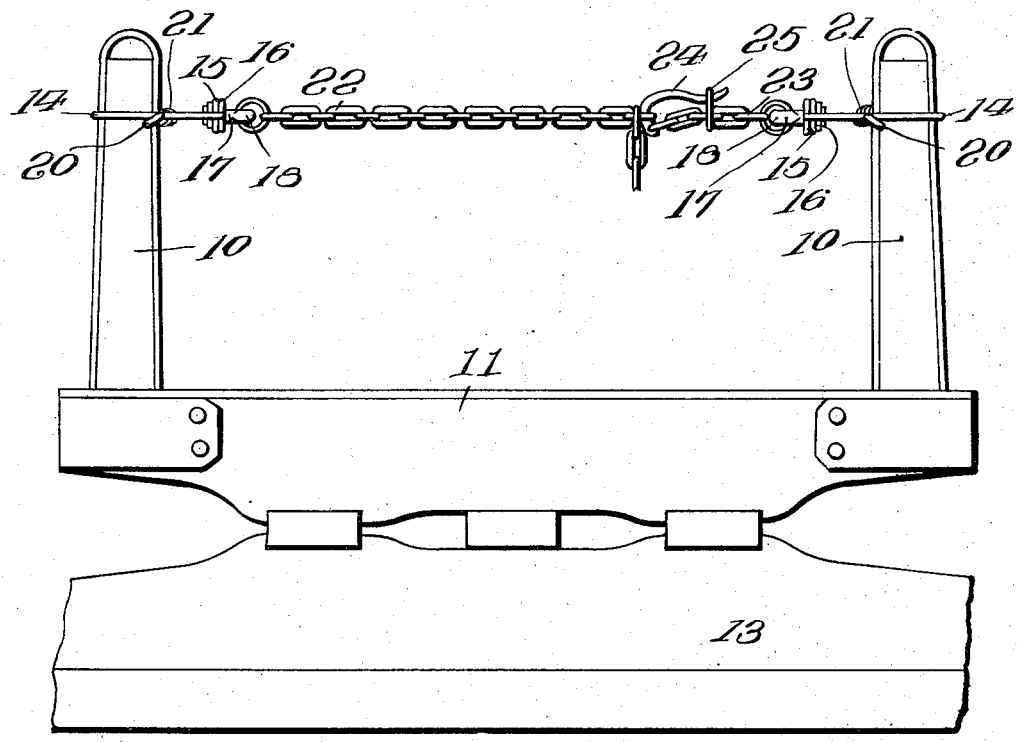
Figure 2:
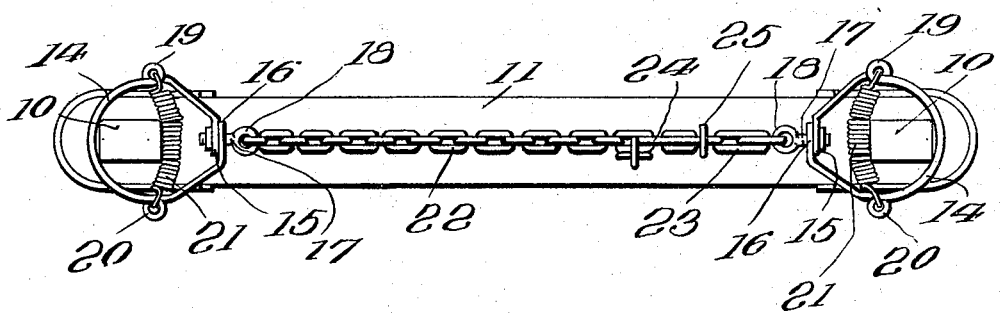

The improved device may be applied to the stakes of ordinary farm wagons, bob-sleighs, some forms of motor trucks and similar vehicles, and it is not desired, therefore, to limit the invention to any specific form of vehicle, but for the purpose of illustration, the device is shown applied to the stakes of an ordinary wagon or bob-sleigh, and in the drawings illustrative of the preferred embodiment of the invention: Figure 1 is an elevation of a portion of the rear axle and its bolster and stakes with the improved device applied; Fig. 2 is a plan view of the parts shown in Fig. 1.

Corresponding and like parts are referred to in the following description and indicated in all the views of the accompanying drawings by the same reference characters.

The improved device is applied to the stakes of the vehicle, represented conventionally at 10, the stakes rising in the ordinary manner from a bolster 11 which is connected in turn to the axle, a portion of which is represented at 13.

The improved device includes coacting loops adapted to engage around stakes and including a yieldable element connected to the sides of each loop and a flexible element extending from each loop and adapted to be drawn toward each other to impart a strain upon the loops. The loops and their attachments are precisely alike and a description of one will suffice for both. Each loop is formed from a single rod bent into a semicircular portion, as represented at 14, and with eyes 15—16 at the terminals of the rod, the eyes being arranged to interlap to receive a swivel member 17 having an eye 18. Formed in the rod at the terminals of the curved portion 14 are eyes 19—20, and connected to each opposite pair of the eyes is a yieldable member, preferably in the form of a coil spring, as represented at 21. The eyes 19—20 are so disposed that, when the loop is forced over the stake 10, the member 21 will be deflected laterally and thus caused to bear with considerable force against the adjacent face of the stake and thus operate to hold the loop yieldably in any position to which it may be adjusted. By this means, the loop may be adjusted vertically upon the stake and will remain wherever placed. Connected to one of the eyes 18 is a flexible element, for instance, a portion of a chain, shown at 22, while another flexible element in the form of a chain 23 is connected to the eye 18 of the other swivel member 17 of the other loop. Pivoted to the terminal link of the flexible element 23 is a draw-hook 24 while an eye 25 is connected to one of the links of the flexible element 23 and adapted to bear over the free end of the element 24 and thus lock the latter in position relative to the other flexible element 23, as indicated in Fig. 1. One of the links of the member 23 is adapted to be engaged over the hook 24 and then the latter drawn over and locked in position by the link 25. By this means, the loops may be drawn toward each other and support the stakes from outward movement under the pressure of the load. By this arrangement, after the load is placed upon the vehicle, the loops are disposed over the stakes and forced downwardly to a position in close proximity to the upper side of the load and the member 22—23 coupled, as before described, and strain applied thereto to draw the loops toward each other and thus effectually support the stakes from outward movement under any pressure which may be exerted by the load. By constructing the member 22 as a chain, the clamp bolt 24 may be connected to any of the links of the chain and thus adapt the device to the distance between the stakes of various vehicles without structural change in the device.

Having thus described the invention, what is claimed as new is:

1. A device of the class described comprising coacting loops adapted to bear respectively around vehicle stakes, a yieldable member connected to each of said loops and adapted to engage said stakes, a flexible element connecting said loops, and means for applying strain to said flexible element to draw said loops toward each other.

2. A device of the class described comprising coacting loops each formed of a rod having overlapping eyes at the ends and eyes intermediate the ends, said loops being adapted to engage respectively around vehicle stakes, a yieldable device connected to the intermediate eyes of said loops and adapted to engage the adjacent stake, swivel devices engaging said overlapping eyes, a flexible element connecting to each of said swivels, and means for applying strain to said flexible element to draw said loops toward each other.

In testimony whereof, I affix my signature.

CARL O. TORGERSON. [L. S.]

Copies of this patent may be obtained for five cents each, by addressing the "Commissioner of Patents. Washington, D. C."